(12) United States Patent
Sherlock et al.

(10) Patent No.: US 8,671,585 B2
(45) Date of Patent: Mar. 18, 2014

(54) METHODS AND APPARATUS FOR FABRICATING A TURBINE NOZZLE ASSEMBLY

(75) Inventors: Graham David Sherlock, Greenville, SC (US); Christopher Edward Thompson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 13/270,521

(22) Filed: Oct. 11, 2011

(65) Prior Publication Data
US 2012/0023746 A1 Feb. 2, 2012

Related U.S. Application Data

(62) Division of application No. 11/621,152, filed on Jan. 9, 2007, now Pat. No. 8,051,564.

(51) Int. Cl.
*G01B 5/213* (2006.01)
*G01B 5/20* (2006.01)
*G01B 3/14* (2006.01)

(52) U.S. Cl.
USPC ................................ 33/645; 33/562; 415/118

(58) Field of Classification Search
USPC ........... 33/549, 551, 552, 562, 645; 29/281.5, 29/464; 73/865.8; 415/118
See application file for complete search history.

(56) References Cited

U.S. PATENT DOCUMENTS

| | | |
|---|---|---|
| 3,365,173 A | 1/1968 | Lynch |
| 3,832,785 A | 9/1974 | Miller |
| 3,920,947 A | 11/1975 | Wachtell et al. |
| 3,963,894 A | 6/1976 | Wachtell et al. |
| 4,333,239 A | 6/1982 | Arrigoni |
| 5,125,796 A | 6/1992 | Cromer |
| 5,343,694 A | 9/1994 | Toborg et al. |
| 5,628,193 A | 5/1997 | Kington et al. |
| 5,758,416 A | 6/1998 | Reverman et al. |
| 6,547,257 B2 | 4/2003 | Cromer |
| 6,842,995 B2 | 1/2005 | Jones et al. |
| 6,886,422 B2 | 5/2005 | King et al. |
| 6,910,278 B2 | 6/2005 | Holder |
| 6,921,246 B2 | 7/2005 | Brainch et al. |
| 6,931,751 B2 | 8/2005 | LaTulippe |
| 7,017,431 B2 | 3/2006 | King et al. |
| 7,024,787 B2 | 4/2006 | Varsell et al. |
| 7,178,255 B1 | 2/2007 | Roesel et al. |
| 8,051,564 B2 * | 11/2011 | Sherlock et al. ............. 29/889.2 |
| 2004/0244180 A1 | 12/2004 | Jones et al. |
| 2005/0217131 A1 | 10/2005 | Varsell et al. |
| 2007/0119042 A1 * | 5/2007 | Thermos et al. ................ 29/464 |
| 2007/0231124 A1 | 10/2007 | Sherlock et al. |
| 2012/0180333 A1 * | 7/2012 | Higgins ......................... 33/551 |

FOREIGN PATENT DOCUMENTS

| | | | | |
|---|---|---|---|---|
| GB | 2155637 A | * | 9/1985 | ............... G01B 5/20 |
| JP | 04335101 A | * | 11/1992 | ............... G01B 3/10 |

* cited by examiner

*Primary Examiner* — R. A. Smith
(74) *Attorney, Agent, or Firm* — Armstrong Teasdale LLP

(57) ABSTRACT

A method for fabricating a nozzle segment for use within a turbine nozzle assembly. The method comprises providing a nozzle segment including an outer band, an inner band, and at least one vane extending there between, wherein at least one of the inner band and the outer band is formed with a transition piece groove defined therein, positioning an inspection tool in contact with the nozzle assembly such that the inspection tool is aligned relative to the nozzle segment using at least one datum, and verifying an alignment of each transition piece groove using the inspection tool.

12 Claims, 5 Drawing Sheets

METHODS AND APPARATUS FOR FABRICATING A TURBINE NOZZLE ASSEMBLY

This application is a divisional of U.S. patent application Ser. No. 11/621,152 filed Jan. 9, 2007, now U.S. Pat. No. 8,051,564, which is hereby incorporated by reference and is assigned to the assignee of the present invention.

BACKGROUND OF THE INVENTION

Known turbine engine nozzle assemblies include combustors which ignite fuel-air mixtures which are then channeled through a transition piece to a turbine nozzle assembly at the front of a turbine. At least some known turbine nozzle assemblies include a plurality of arcuate nozzle segments arranged circumferentially. Some known turbine nozzle segments include a plurality of circumferentially-spaced hollow airfoil vanes coupled by integrally-formed inner and outer band platforms. In such nozzle assemblies, the inner and outer bands each include a transition piece groove that enables the transition piece to be coupled in a sealing arrangement to the turbine nozzle.

Fabrication of turbine nozzle assemblies generally includes coupling a plurality of nozzle segments circumferentially together to form an annular nozzle assembly ring. More specifically, in known turbine nozzle assemblies, defects in any of the nozzle segments may not become known until the entire nozzle assembly is assembled. Moreover, during fabrication of the nozzle segments, the portion of the inner and outer bands including the transition piece groove may be subjected to distortion as various portions of the nozzle segments are welded, for example. Detecting such distortion may not be apparent until all of the nozzle segments are assembled in position within the nozzle assembly. If any of the grooves have distortion the nozzle assembly may not align correctly with the transition piece

BRIEF DESCRIPTION OF THE INVENTION

In one aspect, a method for fabricating a nozzle segment for use within a turbine nozzle assembly. The method comprises providing a nozzle segment including an outer band, an inner band, and at least one vane extending there between, wherein at least one of the inner band and the outer band is formed with a transition piece groove defined therein, positioning an inspection tool in contact with the nozzle assembly such that the inspection tool is aligned relative to the nozzle segment using at least one datum, and verifying an alignment of each transition piece groove using the inspection tool.

In another aspect, an inspection tool for use in fabricating a nozzle segment used with a turbine nozzle assembly. The tool comprises an alignment plate, and a positioning plate coupled to the alignment plate, the alignment plate comprising at least one aperture extending therethrough in a predetermined location that corresponds to a desired alignment of a transition piece groove defined on the nozzle segment being inspected.

In a further aspect, a method for assembling a turbine nozzle assembly for a gas turbine engine. The method comprises providing a plurality of nozzle segments that each include an outer band, an inner band, and at least one vane extending there between, wherein at least one of the inner bands and outer bands on each nozzle segment includes a transition piece groove defined therein, positioning an inspection tool in contact with a nozzle segment to verify an alignment of each transition piece groove, and coupling a plurality of nozzle segments circumferentially together to form a nozzle assembly.

DETAILED DESCRIPTION OF THE INVENTION

Figure 1:
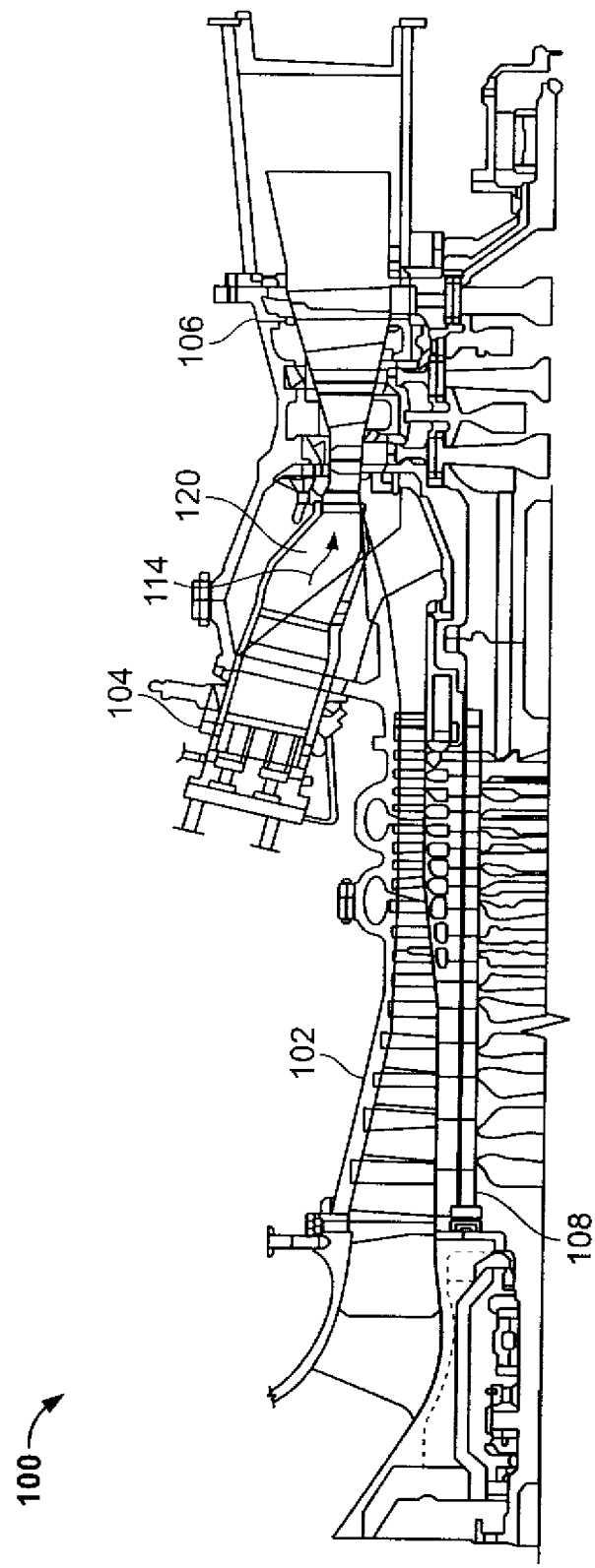
FIG. 1 is cross-sectional view of an exemplary turbine engine.

FIG. 1 is a schematic cross-sectional view of an exemplary gas turbine engine 100. In the exemplary embodiment, engine 100 includes a compressor assembly 102, a combustor assembly 104, a turbine assembly 106 and a compressor/turbine rotor shaft 108. It should be noted that engine 100 is exemplary only, and that the present invention is not limited to engine 100 and may instead be used to fabricate components used with any turbine engine.

During operation, air flows through compressor assembly 102 and compressed air is discharged to combustor assembly 104. Combustor assembly 104 injects fuel, for example, natural gas and/or fuel oil, into the air flow, ignites the fuel-air mixture to expand the fuel-air mixture through combustion and generates a high temperature combustion gas stream 114. Combustor assembly 104 is in flow communication with turbine assembly 106. Resultant combustion gases 114 are channeled from combustor 104 towards turbine assembly 106.

Figure 2:
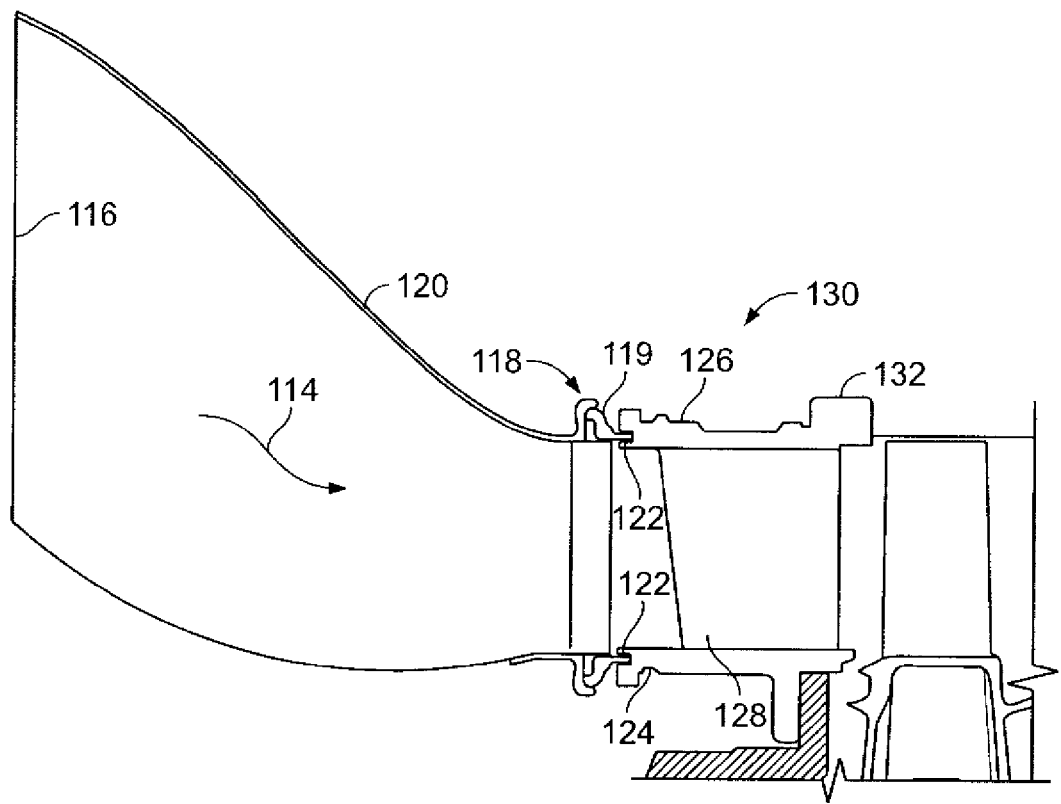
FIG. 2 is an enlarged view of a transition piece and turbine nozzle assembly used with the turbine engine shown in FIG. 1.
Figure 3:
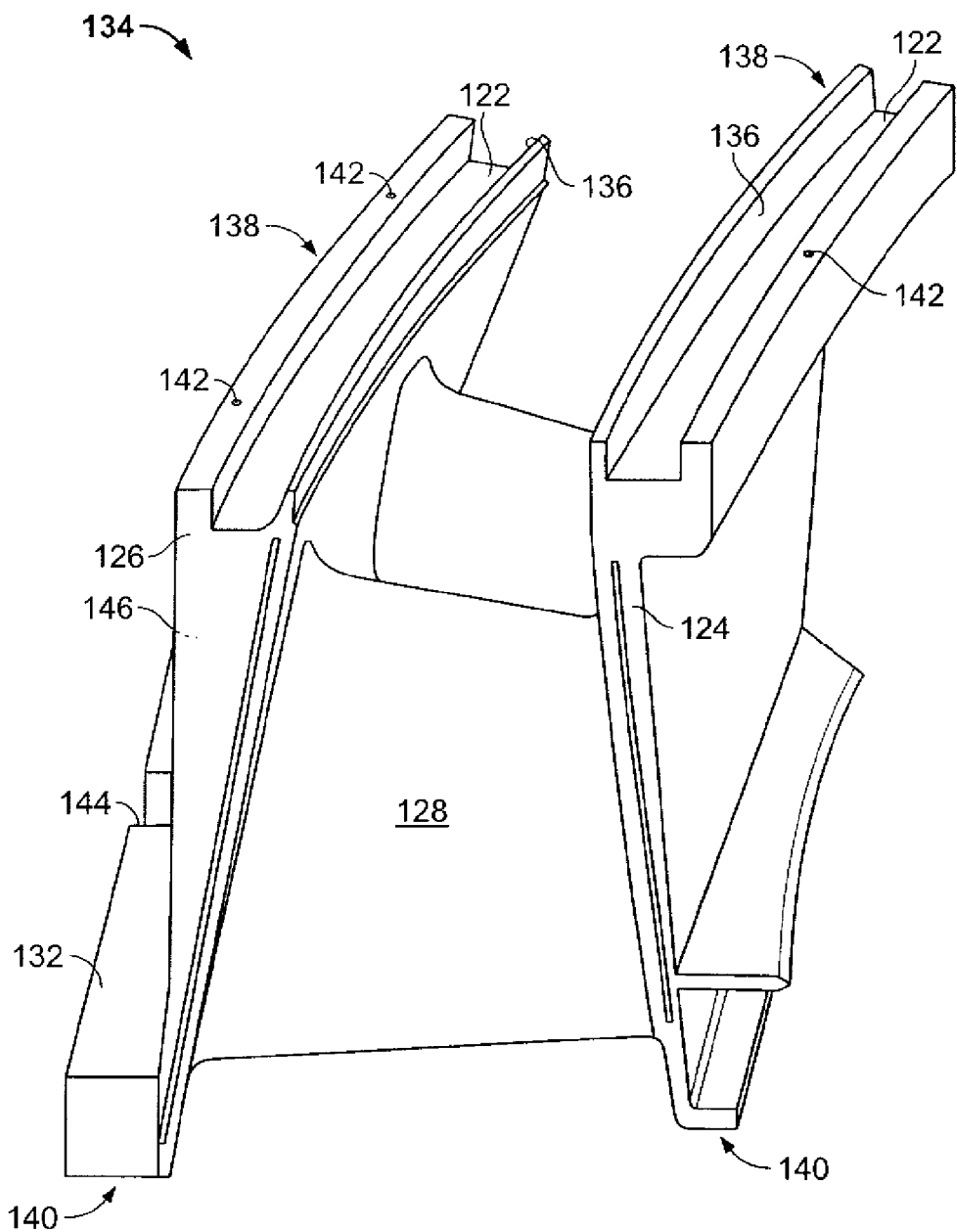
FIG. 3 is a perspective view of a turbine nozzle segment that may be used with the turbine nozzle assembly shown in FIG. 2.

FIG. 2 is an enlarged cross-sectional view of a portion of a transition piece 120 and turbine nozzle assembly 130 that may be used with engine 100 (shown in FIG. 1). FIG. 3 is a perspective view of a turbine nozzle segment 134 that may be used in turbine nozzle assembly 130 shown in FIG. 2. In the exemplary embodiment, transition piece 120 is coupled in flow communication with combustor assembly 104 and turbine nozzle assembly 130. More specifically, transition piece 120 is a hollow structure that includes an upstream end 116 and a downstream end 118. Upstream end 116 is coupled to combustor assembly 104 and downstream end 118 is coupled to turbine nozzle segment 134 using a transition piece groove 122 (as described in more detail below). In the exemplary embodiment, turbine nozzle segment 134 includes a radially inner band 124, a radially outer band 126, at least one airfoil vane 128 extending between inner and outer bands 124 and 126, and an aft flange 132. In the exemplary embodiment, aft flange 132 includes an alignment pin slot 144. Inner and outer bands 124 and 126 also include a forward face 138 and a rearward face 140. Moreover, in the exemplary embodiment, each forward face 138 is formed with a transition piece groove 122 and includes a plurality of datum points 142 (described in more detail below). Specifically, in the exemplary embodiment, each transition piece groove 122 is at least partially defined by a radially inner wall 136.

Transition piece grooves 122 enable transition piece 120 to be coupled to nozzle assembly 130 in a sealing arrangement.

A plurality of nozzle segments 134 are circumferentially coupled together to form nozzle assembly 130 such that transition piece grooves 122 extend circumferentially across nozzle assembly 130. Transition piece downstream end 118 is inserted into transition piece grooves 122 to facilitate coupling transition piece 120 to nozzle assembly 130. Specifically, downstream end 118 is coupled to transition piece grooves 122 via a sealing arrangement. In the exemplary embodiment, downstream end 118 is coupled to transition piece grooves 122 via a groove seal 119. In alternative embodiments, downstream end 118 may be coupled to transition piece grooves 122 using any known coupling method including but not limited to, a brazing or welding process.

During operation, combustion gases 114 flow from combustor assembly 104 through transition piece 120 and are channeled towards turbine nozzle assembly 130 and turbine assembly 106. High temperature combustion gases 114 impart rotational energy to turbine assembly 106 and because turbine assembly 106 is rotatably coupled to rotor 108, rotor 108 subsequently provides rotational power to compressor assembly 102.

Figure 4:
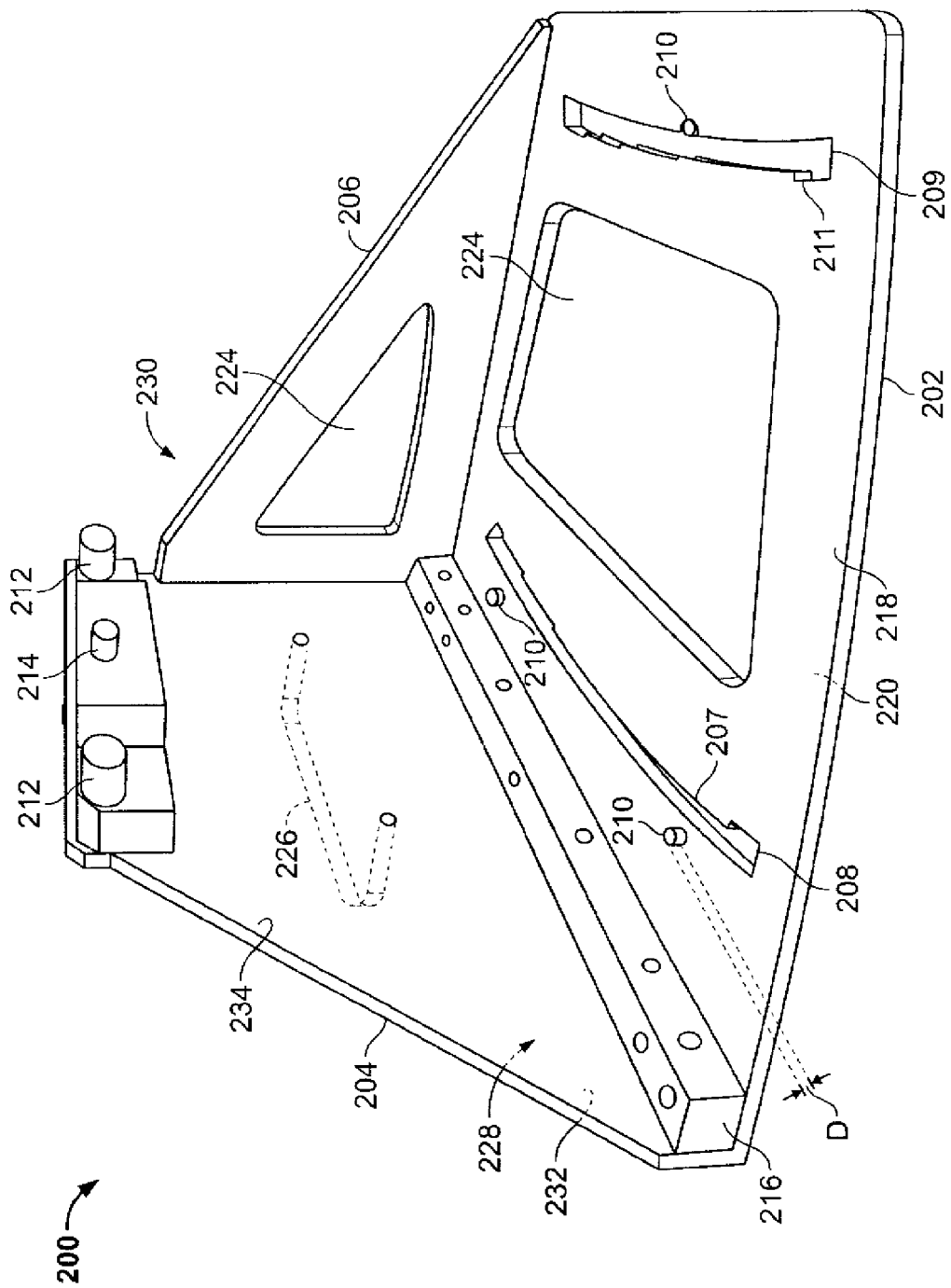
FIG. 4 is a perspective view of the underside of an inspection tool that may be used in fabricating nozzle assemblies such as the nozzle assembly shown in FIG. 2.
Figure 5:
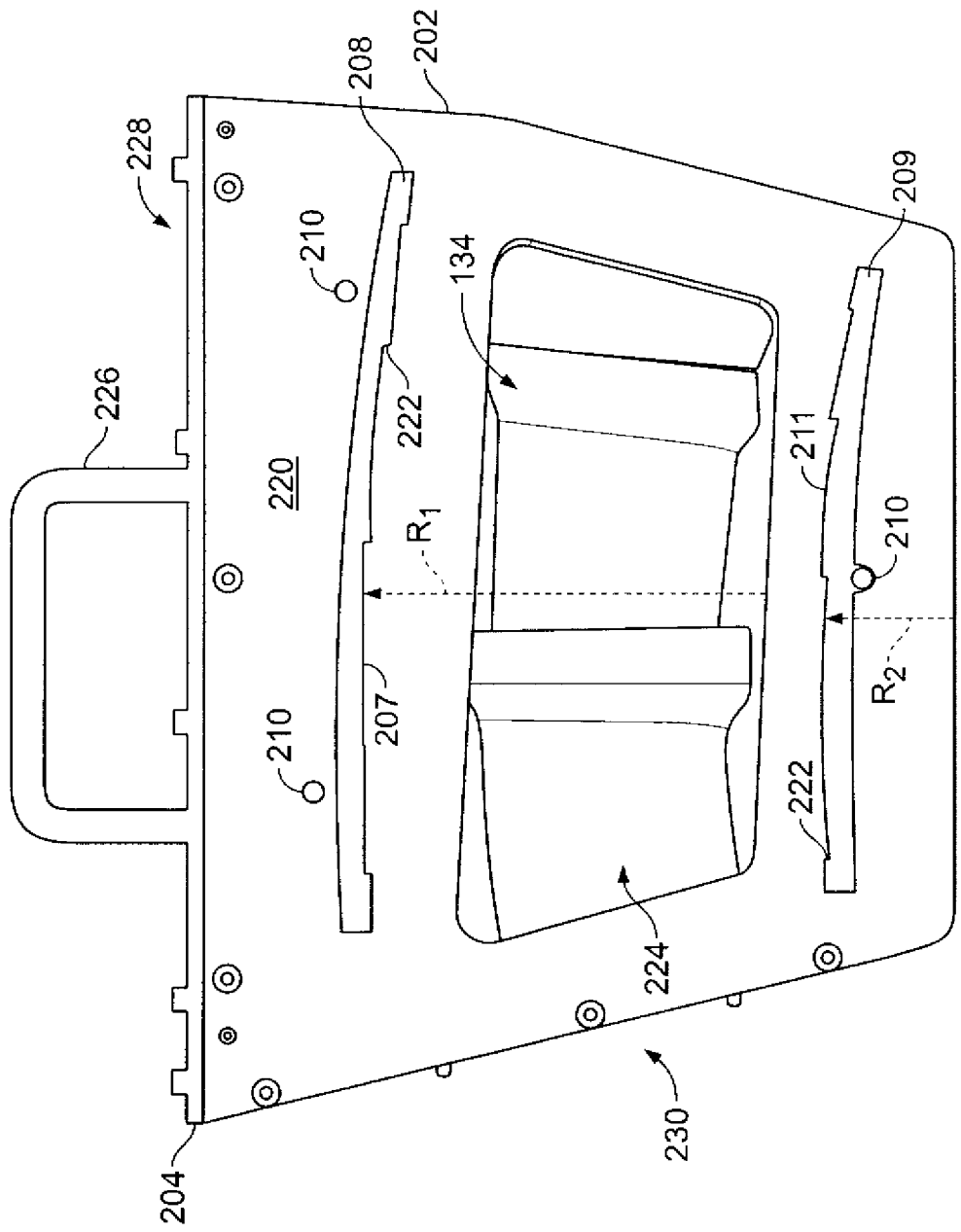
FIG. 5 is a top plan view of the inspection tool shown in FIG. 4 and positioned against a turbine nozzle segment, such as the nozzle assembly shown in FIG. 2.

FIG. 4 is a perspective view of an inspection tool 200 that may be used in fabricating turbine components, such as nozzle segments 134 used with nozzle assembly 130. FIG. 5 is a top view of inspection tool 200 coupled in position against a turbine nozzle segment 134 during an inspection stage of fabrication of nozzle segment 134. In the exemplary embodiment, inspection tool 200 includes an alignment plate 202, a positioning plate 204, a structural support plate 206, and a coupling member 216. Moreover, in the exemplary embodiment, alignment plate 202 is coupled to positioning plate 204 at a first end 228 such that alignment plate 202 extends substantially perpendicular from positioning plate 204. Specifically, in the exemplary embodiment, coupling member 216 is coupled to provide support between alignment plate 202 and positioning plate 204 along first end 228. Structural support plate 206 is coupled to alignment plate 202 and positioning plate 204 at a support end 230 of tool 200. Specifically, support plate 206 facilitates securing plates 202 and 204 together such that a relative alignment between plates 202 and 204 is maintained.

In the exemplary embodiment, alignment plate 202 includes a radially outer aperture 208, a radially inner aperture 209, a plurality of alignment plate datum locators 210, an inner surface 218, and an outer surface 220. Specifically, in the exemplary embodiment, three datum locators 210 extend a distance D inwardly from inner surface 218 on alignment plate 202. More specifically, each locator 210 extends the same distance away from inner surface 218. Alternatively, at least one locator 210 may extend a distance away from surface 218 that is different than a distance the remaining locators 210 extend from surface 218. Locator distance D is selected to enable alignment plate 202 to be positioned in alignment relative to turbine nozzle segment 134 and more specifically, as described in more detail below, relative to nozzle segment inner and outer band faces 138.

Each aperture 208 and 209 has a radius of curvature R1 and R2, respectively, that corresponds to a nominal radius of curvature of a transition piece groove defined on a nominal turbine nozzle segment. Moreover, each aperture 208 and 209 includes a plurality of graduated steps 222 defining a portion of the curvature profile of apertures 208 and 209. Specifically, steps 222 are offset from the nominal radius of curvature in 0.005 inch increments to a maximum of +/−0.030 inches. Moreover, in the exemplary embodiment, steps 222 are defined in a radially inner side 207 of aperture 208 and a radially outer side 211 of aperture 209.

Positioning plate 204 includes an inner surface 234, an outer surface 232, a plurality of positioning plate datum locators 212, and at least one alignment pin 214. In the exemplary embodiment, positioning plate 204 includes two datum locators 212 and one alignment pin 214. In alternative embodiments, plate 204 may include any number of locators 212 and/or alignment pins 214 that enables plate 204 to function as described herein. Moreover, in the exemplary embodiment, a handle 226 is coupled to the outer surface 232 of positioning plate 204. Moreover, in the exemplary embodiment, alignment plate 202 and structural support plate 206 each include a hole 224 for weight reduction of tool 200.

During operation, inspection tool 200 is used to visually verify the radius of curvature of transition piece grooves 122 defined on a turbine nozzle segment 134 being inspected. Inspection tool 200 is coupled in position against turbine nozzle segment 134 such that alignment plate datum locators 210 are placed in contact with the forward faces 138 of inner and outer bands 124 and 126. More specifically, datum locators 210 are each sized and oriented to contact an equal number of corresponding datum points 142 defined on each nozzle segment 134. More specifically, when datum locators 210 are positioned correctly against the datum points defined on nozzle segment 134, positioning plate 204 is positioned against the radially outer wall 146 of outer band 126. Moreover, when tool 200 is properly aligned with respect to nozzle segment 134, alignment pin 214 is inserted within alignment pin slot 144 such that lateral movement of tool 200 relative to the nozzle segment 134 is substantially prevented.

In the exemplary embodiment, when tool 200 is positioned correctly relative to the nozzle segment 134 being inspected, alignment plate datum locators 210 align with three datum points 142 on the forward faces 138 of inner and outer bands 124 and 126. Specifically, in the exemplary embodiment, two datum points 142 are located on outer band 126 and one datum point 142 is located on inner band 124. Alignment plate 202 is substantially parallel with respect to a plane defined by the forward faces 138 of inner and outer bands 124 and 126 when datum locators 210 are in contact with respective datum points 142 defined in nozzle segment 134. Moreover, positioning plate datum locators 212 are aligned against two datum points 142 defined on outer band 126. As such, positioning plate 204 is substantially perpendicular to the plane defined by the forward faces 138 of inner and outer bands 124 and 126 when both positioning plate datum locators 212 are positioned in contact against respective datum points 142 defined on nozzle segment 134 and when alignment pin 214 is inserted within slot 144. Datum locators 210 and 212 facilitate ensuring that inspection tool 200 is properly aligned against each nozzle segment 134 being inspected.

When tool 200 is coupled in position against a turbine nozzle segment 134, the radius of curvature of transition piece grooves 122 are visually verified by using apertures 208 and 209 and steps 222. Specifically, an individual inspecting nozzle segment 134 visually verifies a relative position and radius of curvature of each transition piece groove 122 defined on nozzle segment 134 by looking through apertures 208 and 209 to determine which step 222 is aligned with a respective transition piece groove 122 defined on nozzle segment 134 positioned beneath tool 200. Tool 200 enables the user to determine whether either transition piece groove 122 is distorted at all or to a degree that makes the respective nozzle segment defective.

The above described inspection tool enables the alignment of nozzle segment grooves to be verified prior to the assembly of nozzle assembly within the turbine engine. Early detection of transition piece groove distortion on a nozzle segment facilitates preventing that nozzle segment from being used in the assembly of a nozzle assembly. As a result, the inspection tool facilitates savings of construction time and costs by enabling defects in the transition piece groove to be visually detected prior to the final construction of a nozzle assembly.

Exemplary embodiments of inspection tools for turbine engines are described above in detail. The inspection tools are not limited to use with the specific turbine nozzle segments described herein, but rather, the inspection tool can be utilized independently and separately from other nozzle components described herein. Moreover, the invention is not limited to the embodiments of the nozzle segments described above in detail. Rather, other variations of inspection tool embodiments may be utilized within the spirit and scope of the claims.

While the invention has been described in terms of various specific embodiments, those skilled in the art will recognize that the invention can be practiced with modification within the spirit and scope of the claims.

What is claimed is:

1. An inspection tool for use in fabricating a nozzle segment used with a turbine nozzle assembly, said tool comprising:
    an alignment plate; and
    a positioning plate coupled to said alignment plate, said alignment plate comprising at least one aperture extending therethrough in a predetermined location that corresponds to a desired alignment of a transition piece groove defined on the nozzle segment being inspected, said at least one aperture is arcuate and is formed with a radius of curvature that is substantially identical to a radius of curvature of the transition piece groove.

2. A tool in accordance with claim 1 wherein said alignment plate further comprises at least three datum locators extending from said alignment plate and configured to position said tool in alignment with the nozzle segment.

3. A tool in accordance with claim 1 wherein said alignment plate further comprises at least two datum locators that correspond to at least two datums defined on an outer band of the nozzle segment and at least one datum locator that corresponds to at least one datum defined on the inner band.

4. A tool in accordance with claim 1 wherein said positioning plate comprises at least two datum locators that correspond to at least two datums defined on the nozzle segment.

5. A tool in accordance with claim 1 wherein said at least one aperture is defined by an aperture edge comprising a plurality of steps.

6. A tool in accordance with claim 1 wherein said positioning plate comprises an alignment pin that is substantially centered between a pair of datum locators.

7. A tool in accordance with claim 1 wherein said tool further comprises a handle.

8. A method for assembling a turbine nozzle assembly, said method comprising:
    providing a plurality of nozzle segments that each include an outer band, an inner band, and at least one vane extending there between, wherein at least one of the inner bands and outer bands on each of the nozzle segments includes a transition piece groove defined therein;
    positioning an inspection tool in contact with one of the nozzle segments to verify an alignment of each transition piece groove; determining that each of the transition piece grooves are formed with a radius of curvature that is substantially identical to a radius of curvature formed on the inspection tool; and
    coupling the plurality of nozzle segments circumferentially together to form the nozzle assembly.

9. A method in accordance with claim 8 further comprising positioning the inspection tool including an alignment plate and a positioning plate coupled to the alignment plate, such that at least one aperture is defined within the alignment plate in a predetermined location that corresponds to a desired alignment of the transition piece groove on the nozzle segment.

10. A method in accordance with claim 8 wherein positioning an inspection tool further comprises aligning the tool relative to the nozzle assembly using a plurality of datum locators extending from the inspection tool.

11. A method in accordance with claim 10 wherein aligning the tool further comprises positioning at least three datum locators in contact with three datums on the inner and outer band of the nozzle segment.

12. A method in accordance with claim 10 wherein aligning the tool further comprises positioning at least two datum locators in contact with at least two datums on the outer band of the nozzle segment.

* * * * *